United States Patent
Legrand

(10) Patent No.: US 10,174,134 B2
(45) Date of Patent: Jan. 8, 2019

(54) POLYMER PRODUCT, METHOD FOR PRODUCING THE POLYMER AND USE OF THE POLYMER

(71) Applicant: Kemira Oyj, Helsinki (FI)

(72) Inventor: Sacha Legrand, Oulu (FI)

(73) Assignee: Kemira Oyj, Helsinki (FI)

( * ) Notice: Subject to any disclaimer, the term of this patent is extended or adjusted under 35 U.S.C. 154(b) by 0 days.

(21) Appl. No.: 15/517,960

(22) PCT Filed: Sep. 24, 2015

(86) PCT No.: PCT/FI2015/050639
§ 371 (c)(1),
(2) Date: Apr. 9, 2017

(87) PCT Pub. No.: WO2016/055691
PCT Pub. Date: Apr. 14, 2016

(65) Prior Publication Data
US 2017/0240661 A1    Aug. 24, 2017

(30) Foreign Application Priority Data

Oct. 9, 2014 (FI) .................................... 20145885

(51) Int. Cl.
| | | |
|---|---|---|
| *C08F 226/02* | (2006.01) | |
| *C08F 8/12* | (2006.01) | |
| *C08K 5/20* | (2006.01) | |
| *D21H 17/38* | (2006.01) | |
| *D21H 17/45* | (2006.01) | |
| *D21H 21/10* | (2006.01) | |
| *D21H 21/20* | (2006.01) | |
| *C08F 271/00* | (2006.01) | |
| *D21H 17/34* | (2006.01) | |

(52) U.S. Cl.
CPC .............. *C08F 8/12* (2013.01); *C08F 226/02* (2013.01); *C08F 271/00* (2013.01); *C08K 5/20* (2013.01); *D21H 17/34* (2013.01); *D21H 17/38* (2013.01); *D21H 17/45* (2013.01); *D21H 21/10* (2013.01); *D21H 21/20* (2013.01)

(58) Field of Classification Search
CPC ...... C08F 226/025; C08F 271/00; C08F 8/12; C08K 5/20; D21H 17/34; D21H 17/38; D21H 17/45; D21H 21/10; D21H 21/20
See application file for complete search history.

(56) References Cited

U.S. PATENT DOCUMENTS

| | | | |
|---|---|---|---|
| 7,718,193 B2 | 5/2010 | Stayton et al. | |
| 2008/0009596 A1* | 1/2008 | Gu ........................ | C08F 226/02 526/311 |
| 2009/0043051 A1 | 2/2009 | Gu et al. | |
| 2011/0112224 A1 | 5/2011 | Borkar et al. | |

FOREIGN PATENT DOCUMENTS

| | | |
|---|---|---|
| DE | 3720194 A1 | 12/1987 |
| DE | 19527773 A1 | 2/1996 |
| DE | 19701523 A1 | 7/1998 |
| WO | 2007136756 A2 | 11/2007 |

OTHER PUBLICATIONS

Ethylidene group downloaded from http://www.rsc.org/publishing/journals/prospect/ontology.asp?id=CHEBI:29853&MSID=b805233f Mar. 31, 2018.*
Finnish Patent and Trademark Office, Search Report issued on FI20145885, dated Jun. 10, 2015.

* cited by examiner

*Primary Examiner* — Irina S Zemel
*Assistant Examiner* — Jeffrey S Lenihan
(74) *Attorney, Agent, or Firm* — Berggren LLP

(57) ABSTRACT

The present invention relates to a method for producing a cationic polyvinyl amine based copolymer. The present invention further relates to a cationic polyvinyl amine based copolymer and use of the copolymer in paper industry as a strength agent, a retention agent and a drainage agent.

17 Claims, 1 Drawing Sheet

POLYMER PRODUCT, METHOD FOR PRODUCING THE POLYMER AND USE OF THE POLYMER

PRIORITY

This application is a U.S national application of PCT-application PCT/FI2015/050639 filed on Sep. 24, 2015 and claiming priority of Finnish national application FI20145885 filed on Oct. 9, 2014, the contents of all of which are incorporated herein by reference.

FIELD OF THE INVENTION

The present invention relates to a method for producing a cationic polyvinyl amine based copolymer. The present invention additionally relates to a cationic polyvinyl amine based copolymer and use of the copolymer in paper industry.

BACKGROUND ART

Paper industry continuously strives to improve paper and paperboard quality, increase process speeds, reduce manufacturing costs etc. Various chemicals, synthetic and naturally occurring, are used to treat pulp in order to improve, for example, retention and drainage, and to create physical properties such as wet and dry strength of the final paper product.

A retention agent is a process chemical that improves the retention of a functional chemical in a substrate. The result is that totally fewer chemicals are used to get the same effect of the functional chemical and fewer chemicals goes to waste. Typical chemicals used as retention aids are polyacrylamide (PAM), polyethyleneimine (PEI) and bentonite.

Drainage additives are materials that increase drainage rate of water from pulp slurry on a wire. Common drainage additives are cationic starch, acrylamide and poly(diallyldimethyl-ammonium chloride) (DADMAC).

Wet strength additives ensure that when paper becomes wet, it retains its strength. This is especially important in a tissue paper. Normal wet strength additives are urea-formaldehyde (UF), melamine-formaldehyde (MF) and polyamide-epichlorohydrin (PEA).

Dry strength additives are chemicals that improve paper strength of normal or not wet condition. Typical chemicals used are starch and PAM derivatives. The starch and PAM derivatives may be anionically or cationically charged. By using cationic starch or PAM, negatively charged fibers can bind with the cationic starch or PAM and thus increase interconnections between the fibers, and thus strength.

An example of strength additives, retention and drainage aids are disclosed in document WO 2007/136756. The document discloses Michael addition adducts of vinylamines, such as polyvinylamine (PVAM), with compounds having an unsaturated bond conjugated to an electron withdrawing group to be used as strength additives, retention and drainage aids in paper making processes.

There is, however, still a need for new additives having improved influence on retention, drainage and strength properties.

SUMMARY OF THE INVENTION

The present invention relates to a method for producing a cationic polyvinyl amine based copolymer according to claim 1.

The present invention further relates to a cationic polyvinyl amine based copolymer according to claim 11.

The present invention additionally relates to a use of the cationic polyvinyl amine based copolymer in paper industry according to claim 15.

It has now been surprisingly found that novel cationic polyvinyl amine based copolymers of general formula I improve retention and drainage during paper manufacturing, and strength properties of a final paper product.

Polyvinylamines (PVAM) are usually linear polymers. It has been now found that due to this linearity, their performance as strength additives or retention and drainage agents is limited. The novel cationic polyvinyl amine based copolymers of the present invention have three dimensional structures. Poly(N-vinylformamide-poly(vinylamine) (PNVF-PVAM) linear backbone of the copolymer is branched with one or several polyacrylamide-type polymer(s) for creating the three dimensional structure. Moreover, the polyacrylamide-type polymer part brings $CONH_2$ groups to the copolymer. These groups (amide groups) change the physical and chemical properties of the PNVF-PVAM in aqueous solutions, and enhance inter- and intramolecular interactions. In the presence of the amide groups, more hydrogen-bonds are formed between the copolymer and fiber, resulting in better performance in strength, retention or drainage-based phenomena. The new structural feature of the copolymer of the present invention increases the performance application in paper industry.

DETAILED DESCRIPTION OF THE INVENTION

Figure 1:
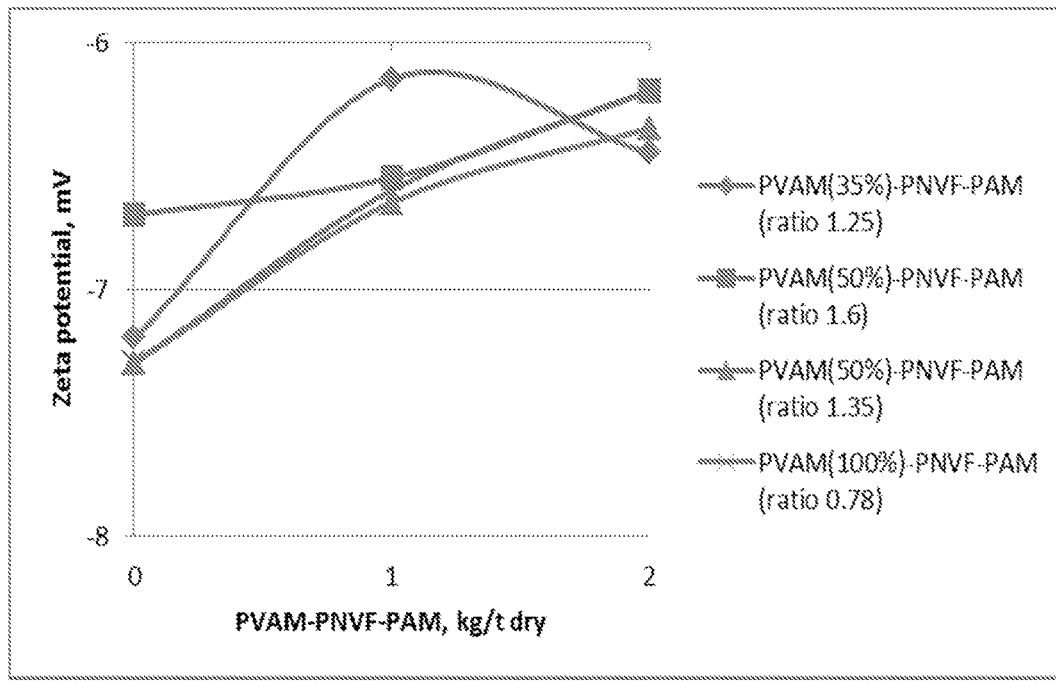
FIG. 1 discloses zeta potential (mV) values of the cationic polyvinyl amine based copolymers according to the present invention in water.

In one aspect of the present invention there is provided a method for producing a cationic polyvinyl amine based copolymer. The cationic polyvinyl amine based copolymer is prepared via a Michael addition where amino groups of poly(vinylamine) (PVAM) react with one double bond of a cross-linking agent and the other double bond present in the cross-linking agent reacts with monomers (such as acrylamide), building corresponding polymer (such as poly(acrylamide) (PAM)).

More particularly there is provided a method for producing a cationic polyvinyl amine based copolymer having general formula I

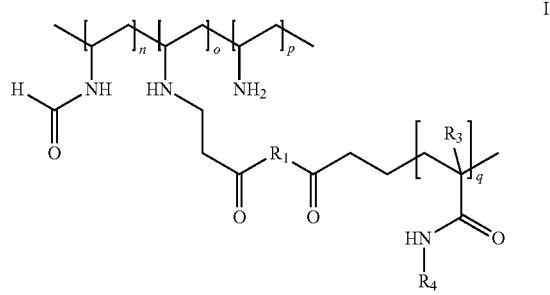

wherein $R_1$ is selected from NH—$R_2$—NH or group represented by formula;

$R_2$ is selected from the group consisting of $CH_2$, $CH(CH_3)CH_2$, $(CH_2)_2$, $(CH_2)_3$, $(CH_2)_4$, $(CH_2)_5$, $(CH_2)_6$, $(CH_2)_7$, $(CH_2)_8$, $(CH_2)_9$, $(CH_2)_{10}$, $(CH_2)_{11}$, $(CH_2)_{12}$, CH=CH, and cyclohexyl;

$R_3$ is selected from H and $CH_3$;

$R_4$ is selected from the group consisting of H, $CH_2OH$, $(CH_2)_3N(CH_3)_2$, and $CH(CH_3)_2CH_2N(CH_3)_3$;

n, o, p and q are integers and n+o+p ranges from 650 to 26 000, o/(o+p) ranges from 10/100 to 100/100, and q is between 325 and 130 000;

wherein the method comprises reacting a polymer having general formula II

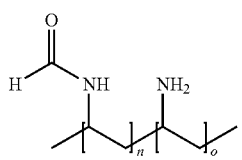

wherein n and o are integers, and n+o ranges from 650 to 26 000 with a compound having general formula III

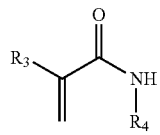

wherein $R_3$ and $R_4$ are as defined above, in presence of a cross-linking agent having general formula IV

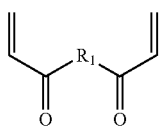

wherein $R_1$ is as defined above; and obtaining the cationic polyvinyl amine based copolymer having the general formula I.

The n, o, p and q are integers, representing numbers of its repeating unit distributed in the polymer. The n is 0 or positive integer; the o, p and q are positive integers, and n+o+p ranges from 650 to 26 000, o/(o+p) ranges from 10/100 to 100/100, and q is between 325 and 130 000.

In one embodiment the compound having the general formula III is selected from the group consisting of acrylamide, (meth)acrylamide, N-methylolacrylamide, N-methylol(meth)acrylamide, N,N-dimethylaminopropyl acrylamide, N,N-dimethylaminopropylacrylamide, N,N-dimethylaminopropylmethacrylamide, N,N-dimethylaminoethylacrylamide, N-[2-(dimethylamino)-1,1-dimethylethyl]-acrylamide and their methyl chloride quaternaries, or mixtures thereof. Preferably the compound having the general formula III is acrylamide. The acrylamide is the most reactive monomer. The compounds having the general formula III are commercially available.

In one embodiment the cross-linking agent having general formula IV is selected from the group consisting of N,N'-methylene-bisacrylamide (MBA), 1,4-bis(acryloyl)piperazine, N,N'-(1-methyl-1,2-ethanediyl)bis(2-propenamide), N,N'-propylidenebis(2-propenamide), N,N'-butylidenebis(2-propenamide), N,N'-1,12-dodecanediylbis(2-propenamide), N,N'-1,9-nonanediylbis(2-propenamide), N,N'-1,5-pentanediylbis(2-propenamide), N,N'-1,4-butanediylbis(2-propenamide), N,N'-1,6-hexanediylbis(2-propenamide), N,N'-ethylidenebis(2-propenamide), N,N'-1,3-propanediylbis(2-propenamide), N,N'-1,2-ethanediylbis(2-propenamide), N,N'-1,4-cyclohexanediylbis(2-propenamide), N,N'-1,8-octanediylbis(2-propenamide), N,N'-bis(acryloyly) imidazoline, or mixtures thereof. Preferably the cross-linking agent having general formula IV is N,N'-methylene-bisacrylamide (MBA). MBA can be manufactured with known methods. Additionally, the cross-linking agents having general formula IV are commercially available.

In one preferred embodiment the $R_1$ is NH—$R_2$—NH; $R_2$ is $CH_2$; $R_3$ is H; and $R_4$ is H.

The polymer of general formula II (also referred to as polyvinylamine-poly(N-vinylformamide) (PVAM-PNVF)) can be obtained by hydrolysis of poly(N-vinyl-formamide) (PNVF).

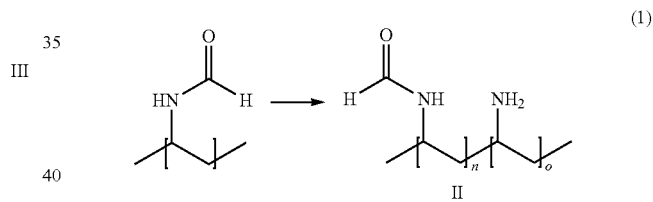

The n and o are integers, representing numbers of its repeating unit distributed in the polymer in a random fashion, wherein n is 0 or positive integer, o is a positive integer and n+o ranges from 650 to 26 000.

The hydrolysis reaction can be acidic or basic hydrolysis. Preferably the hydrolysis is acid hydrolysis.

Degree of the hydrolysis is preferably from 10 to 100%. When the degree of hydrolysis is 100%, the integer n is 0. Most preferably the hydrolysis degree is from 10% to 50%. Polymers with high hydrolysis degrees are difficult to handle. This is due to high viscosity due to high level of $NH_2$ groups.

In one embodiment the polymer of general formula II is obtained from acid hydrolysis reaction of poly(N-vinylformamide) (PNVF).

In a preferred reaction method, the hydrolysis reaction is carried out under nitrogen atmosphere. The PNVF is mixed together with $Na_2S_2O_4$ and water. The mixture is mixed until $Na_2S_2O_4$ is dissolved. Acid, such as HCl, is added, preferably slowly, and the reaction mixture is warmed first to 50-55° C. and then to 80-85° C. The reaction mixture is cooled to room temperature and the polymer of general formula II is recovered.

By altering the amounts of reagents, reaction temperature and reaction time the degree of the hydrolysis can be altered.

The PNVF is commercially available. The PNVF can also be synthesized from N-vinylformamide (NVF) with known methods. In one of these methods NVF is dissolved in water under nitrogen atmosphere. Initiator, such as azo-bis(isobutyronitrile) (AIBN), is added and the reaction mixture is stirred at elevated temperature, such as 60° C. After cooling to room temperature, the PNVF polymer is recovered.

In one embodiment the reaction of the polymer having general formula II with the compound having general formula III in the presence of the cross-linking agent having general formula IV is performed in presence of an initiator. Preferably, the initiator is a peroxide type initiator, such as tert-butyl hydroperoxide (TBHP), dicumyl peroxide, benzoyl peroxide, lauroyl peroxide, 2-butanone peroxide or cyclobutane malonyl peroxide. Most preferably the initiator is tert-butyl hydroperoxide (TBHP).

The reaction is carried out at temperature from 10 to 100° C., preferably at from 20 to 90° C., most preferably at 65-75° C. such as 70° C.

The reaction can be conducted in a reaction media. The reaction media is a protic or polar solvent. Water is preferably used. The solid content, in which the copolymerization is performed, varies from 2 to 15%. The solid content is not higher than 15% because then viscosity of the solution is too high. The solid content is more preferably 10%. If the solid content is too low, the amount of active substances is not high enough and a large volume of solution will be needed for good application results.

In one embodiment weight ratio between the polymer having general formula II and the compound having general formula III is from 2:1 to 1:5, preferably from 1:1 to 1:4.

In one embodiment percentage in weight of the cross-linking agent having general formula IV and the compound having general formula III is between 1 and 5%, preferably between 2 and 2.5%.

In a preferred reaction method, the polymer having general formula H, the compound having general formula III dissolved in a suitable solvent (protic or polar solvent, preferably water) and the cross-linking agent having general formula IV are added, preferably serially, in a flask. pH of the solution is adjusted to 7-8. If the initial solution is basic (pH over 8), acid such as HCl (37%) is added. If the initial solution is acidic, base such as NaOH (2 N) is added. The mixture is stirred under nitrogen atmosphere for 15-60 min, such as 30 min, at 65-75° C., such as 70° C. Initiator, such as tert-butyl hydroperoxide (TBHP), is added to the mixture, and the mixture is stirred at 65-75° C., such as 70° C., for 3-7 h, such as 5 h, under nitrogen atmosphere. The cationic polyvinyl amine based copolymer of general formula I is formed, and purified by dialysis.

In second aspect of the present invention there is provided a cationic polyvinyl amine based copolymer.

More particularly there is provided a cationic polyvinyl amine based copolymer having general formula I

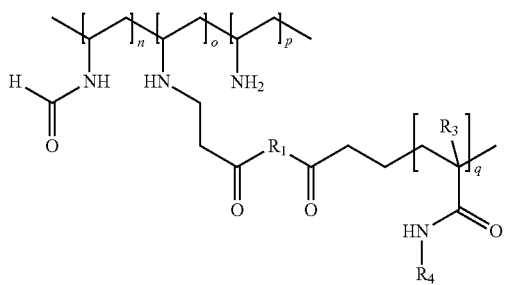

wherein
the $R_1$, $R_2$, $R_3$ and $R_4$ are as defined above. The integers are n, o, p and q are as defined above.

In one preferred embodiment the $R_1$ is NH—$R_2$—NH; $R_2$ is $CH_2$; $R_3$ is H; and $R_4$ is H.

Cationic charge of the cationic polyvinyl amine based copolymer of general formula I is from 0.1 to 5 meq/g, preferably from 0.85 to 4.1 meq/g, more preferably from 1.0 to 2.0 meq/g such as 1.5 meq/g, measured at pH 2.5 by Mütek™ method.

The charge density measurement (meq/g) is determined using a Mütek™ particle charge detector (PCD-03) from BTG Mütek GmbH. The standards used were the cationic solution poly-DADMAC (c=0.001 mol/L) and the anionic solution PES-Na (polyethene sodium sulfonate; c=0.001 mol/L).

Weight average molecular weight of the cationic polyvinyl amine based copolymer of general formula I is preferably from 100 000 g/mol to 4 000 000 g/mol, and more preferably from 120 000 g/mol to 1 000 000 g/mol. If the molecular weight is below 100 000 g/mol, the polymer loses its efficiency.

In third aspect of the present invention there is provided use of the cationic polyvinyl amine based copolymer of general formula I.

More particularly, the cationic polyvinyl amine based copolymer of general formula I is used in paper industry as a strength (dry or wet strength) agent, as a retention agent or as a drainage agent.

Used dosage of the cationic polyvinyl amine based copolymer of general formula I is 0.25-5%, preferably 0.5-2% (kg of active content per ton of dry weight of pulp).

In the following the invention will be described in more detail by means of examples. The purpose of the examples is not to restrict the scope of the claims.

EXAMPLES

Materials

All chemicals were used as received without further purification.

Poly(N-vinylformamide) (PNVF) was purchased from DNX (Mitsubishi).

Azobis(isobutyronitrile) (AIBN), from Acros, 98% purity.

N,N'-methylene-bisacrylamide (MBA), from Fluka, 99% purity

Tert-butyl hydroperoxide (TBHP), from Aldrich, 70% weight in water

Acrylamide, from Kemira, 50% weight in water or pure from Acros, 98.5%

Apparatuses and Analyzes

Solid content (SC): the amount of polymer in solution (%) was determined using a halogen moisture analyzer HR 73 from Metter Todelo and corresponding standard method (T=150° C.).

Viscosity: the viscosity (cP) was determined using a Brookfield Digital Visco-meter (model DV-I+) following the standard instructions (manual M/92-021-P405)

Molecular weight distribution: $M_w$, $M_n$ and PD were measured using an Agilent 1100 series SEC apparatus equipped with a RI detector. Polymers were dissolved in THF before injection. The standards used for the determination of the molecular weight were a series of PEO (polyethylene glycol) with molecular mass ($M_w$) varying from 430 to 1 015 000.

pH meter: pH was measured using Knick Portamess pH meter.

Charge density measurement (meq/g) was determined using a Mütek™ particle charge detector (PCD-03) from BTG Mütek GmbH. The standards used were the cationic solution poly-DADMAC (c=0.001 mol/L) and the anionic solution PES-Na (polyethene sodium sulfonate; c=0.001 mol/L).

Example 1: Preparation of a Poly(N-vinylformamide) (PNVF) from N-vinyl-formamide (NVF)

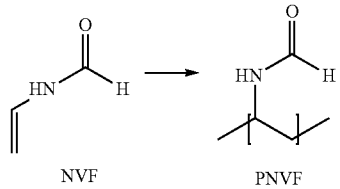

A 200 mL multi-neck reactor was equipped with a thermometer, a reflux condenser and a nitrogen inlet. The apparatus was purged constantly with nitrogen. In the reactor, NVF (30 g) was mixed together with water (150 g) and the reaction mixture was stirred at room temperature for few minutes until NVF was well dissolved. Then, initiator azobis (isobutyronitrile) (AIBN) (0.75 g) was added and the reaction was stirred at T=60° C. for 4 h. After cooling to room temperature, the PNVF polymer was recovered. The obtained PNVF polymer was analyzed (results disclosed in Table 1).

TABLE 1

| Polymer | Conversion rate (%) | Molecular weight (Mw) | pH | Solid content (%) | Viscosity (cP) |
|---|---|---|---|---|---|
| PNVF | 94 | 295 050 | 5.28 | 16.12 | 4 603 |

Example 2: Preparation of Polymer Having General Formula II (polyvinylamine-poly(N-vinylformamide) (PVAM-PNVF)) From Hydrolysis (50%) of PNVF

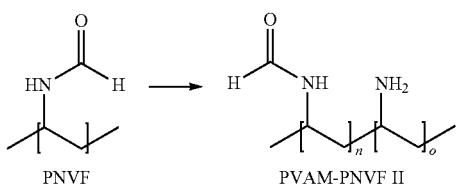

The reaction was performed with continuous flow of $N_2$. In the flask, PNVF prepared in Example 1 (70 g of the solution, 16.12%) was mixed together with $Na_2S_2O_4$ (2.55 g) and water (103 g). The reaction was mixed well until all $Na_2S_2O_4$ was dissolved. HCl (37%, 7.48 mL) was then added slowly and the reaction was warmed to T=50° C. The reaction mixture was stirred at T=50° C. for 2 h and then at T=80° C. for 3 h. The reaction mixture was then cooled to room temperature and the PVAM-PNVF was recovered. The obtained PVAM-PNVF polymer was analyzed (results disclosed in Table 2).

TABLE 2

| Polymer of general formula II | Molecular weight (Mw) | pH | Solid content (%) | Viscosity (cP) | Charge (pH = 7.2) | Charge (pH = 2.5) |
|---|---|---|---|---|---|---|
| PVAM (50%)-PNVF | 367 400 | 1.62 | 7.85 | 67.2 | 2.3 meq/g | 3.3 meq/g |

Example 3: Preparation of a Cationic Polyvinyl Amine Based Copolymer Having General Formula I from (PVAM-PNVF)

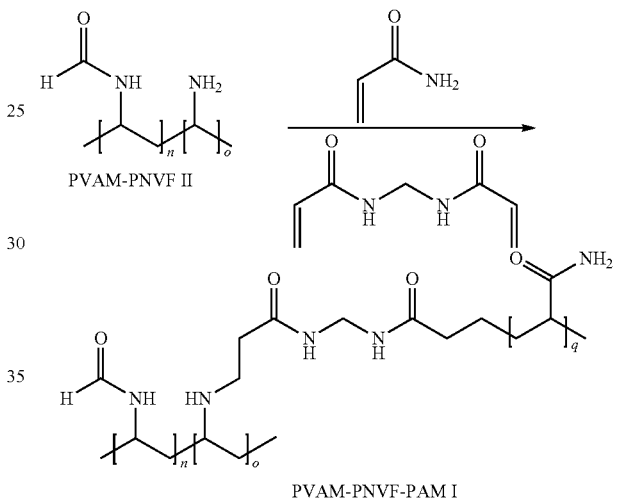

The reaction is performed with continuous flow of $N_2$. In the flask PNVF-PVAM (aqueous solution: 75 g, solid content 2.7%, 35% hydrolysis degree) is mixed together with acrylamide (16.2 g, 50% wt. aqueous solution), MBA (5.5 g, 2% wt. aqueous solution) and water (80 g). The pH of the solution is adjusted to 7 with HCl (37%). The reaction is mixed well for 30 minutes at T=70° C. Then, TBHP (0.1 g, 70% wt. aqueous solution) was added and the solution was stirred at T=70° C. for 5 h. The reaction mixture is then cooled to room temperature and the polymer was analyzed.

Copolymers of the general formula I were also prepared from PVAM-PNVF polymers having hydrolysis degrees of 10%, 35% and 100% (prepared with the method of Example 2) with same procedure as in Example 3 with different acrylamide/PVAM-PNVF ratios.

In Table 3 are presented results of analyzes of the produced cationic polyvinyl amine based copolymers having general formula I. Notation PVAM(10%)-PNVF denotes that hydrolysis degree of PNVF was 10%. Similarly PVAM (50%)-PNVF denotes that hydrolysis degree of PNVF was 50%. PVAM(100%)-PNVF denotes that hydrolysis degree of PNVF was 100%, meaning that the polymer does not contain PNVF at all.

TABLE 3

| Raw materials | PVAM (10%)-PNVF; Acrylamide | PVAM (35%)-PNVF; Acrylamide | PVAM (50%)-PNVF; Acrylamide | PVAM (50%)-PNVF; Acrylamide | PVAM (100%)-PNVF; Acrylamide | PVAM (100%)-PNVF; Acrylamide |
|---|---|---|---|---|---|---|
| Ratio between acrylamide and PVAM-PNVF | 1.32 | 1.25 | 1.6 | 1.35 | 1.33 | 0.78 |
| Cationic charge (meq/g), (pH = 2.5) | 0.8 | 1.3 | 1 | 1.4 | 2.8 | 4 |
| Molecular weight (g/mol) | Several millions | 117 550 | 128 700 | 424 150 | ND | ND |

Example 4: Fixation and Adsorption Activities of the Cationic Polyvinyl Amine Based Copolymer Having General Formula I with Pulp Fixation and adsorption activities of the cationic copolymers prepared in Example 3 with a pulp sample from Palm Wörthmil (fluting paper sheets/OCC) are measured.

The pulp used in this experiment was prepared from fluting paper sheets (European OCC) and tap water. The hardness of the tap water was adjusted to 520 mg/L ($Ca^{2+}$) by addition of $CaCl_2.H_2O$. The pH of the water was adjusted to 7 by addition of HCl (37%) and the conductivity was adjusted to 4 mS/cm by addition of NaCl. The paper was cut to 2×2 cm pieces. Water (usually 2.7 L per batch) was heated to T=50° C. and the paper was added until a 2% consistency was reached (usually 20 g of paper per liter of water). After wetting time of 10 minutes, disintegration was started. The resulting pulp was used immediately for Zeta-potential measurement and fixation studies. If the pulp was used one or few days after, a biocide (100 ppm) was added every 24 hours.

Zeta-potential measurement: 500 mL of the pulp was taken and the copolymer (diluted at 0.2% with water), prepared in Example 3, at different dosage levels (0, 1 or 2 kg/t as dry polymer) was added at room temperature. After strong stirring for 15 seconds, followed by filtration in funnel through black ribbon filtrate paper, the charge of the resulting mixture was measured using a Mütek Zeta potential (two times per test points). The results of the tested copolymers are presented in FIG. 1, and confirm the presence of cationic charges in the tested copolymers.

Figure 2:
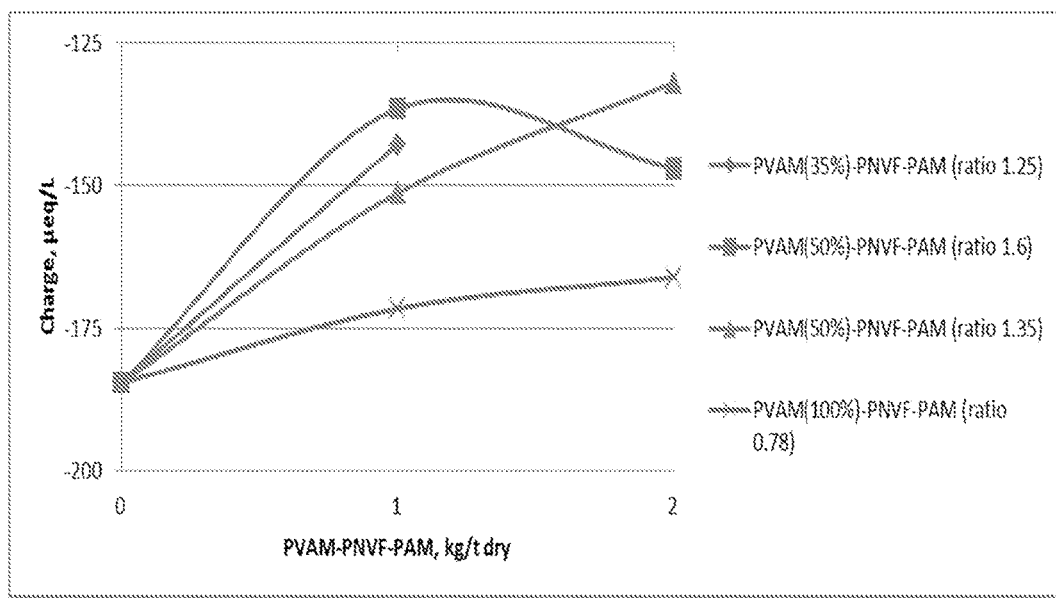
FIG. 2 discloses charge (μeq/L) values of the cationic polyvinyl amine based copolymers according to the present invention in water.

Fixative properties of the polymers: 100 mL of the pulp was taken and the copolymer (diluted at 0.2% with water), prepared in Example 3, at different dosage levels (0, 1 or 2 kg/t as dry polymer) was added at room temperature. After strong stirring for 15 seconds, followed by filtration in funnel through black ribbon filtrate paper, the charge of the resulting mixture was measured using a Mütek PCD device. The results of the tested copolymers are presented in FIG. 2. The results show that the copolymers of the present invention have fixative properties and can be used for paper applications.

The invention claimed is:

1. A method for producing a cationic polyvinyl amine based copolymer having general formula I

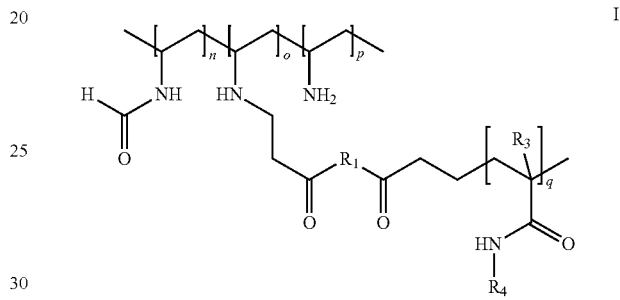

wherein
$R_1$ is selected from $NH-R_2-NH$, 4-imidazoline and a group represented by formula;

$R_2$ is selected from the group consisting of $CH_2$, $CH(CH_3)CH_2$, $(CH_2)_2$, $(CH_2)_3$, $(CH_2)_4$, $(CH_2)_5$, $(CH_2)_6$, $(CH_2)_7$, $(CH_2)_8$, $(CH_2)_9$, $(CH_2)_{10}$, $(CH_2)_{11}$, $(CH_2)_{12}$, $CH=CH$, $CH_2-CH=CH$, $(CH_2)_2-CH=CH$, $CH_2-CH=CH-CH_2$, and cyclohexyl;
$R_3$ is selected from H and $CH_3$:
$R_4$ is selected from the group consisting of H, $CH_2OH$, $(CH_2)_2N(CH_3)_2$, $(CH_2)_2N(CH_3)_3Cl$, $(CH_2)_3N(CH_3)_2$, $(CH_2)_3N(CH_3)_3Cl$, $C(CH_3)_2(CH_2)N(CH_3)_2$ and $CH(CH_3)_2CH_2N(CH_3)_3Cl$;
n and p are independently 0 or positive integer, o, and q are positive integers, and n+o+p ranges from 650 to 26 000, o/(o+p) ranges from 10/100 to 100/100, and q is between 325 and 130 000;
wherein the method comprises reacting a polymer having general formula II

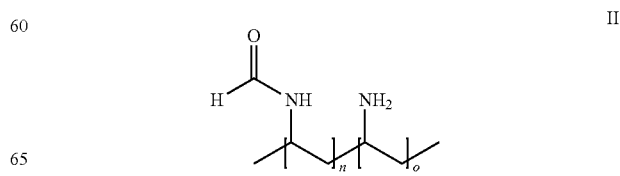

wherein n is 0 or positive integer and o is positive integer, and n+o ranges from 650 to 26 000
with a compound having general formula III

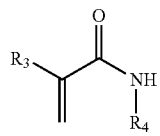

wherein $R_3$ and $R_4$ are as defined above,
in presence of a cross-linking agent having general formula IV

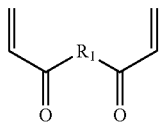

wherein $R_1$ is as defined above; and
obtaining the cationic polyvinyl amine based copolymer having the general formula I.

2. The method according to claim 1, wherein the polymer of formula II is obtained by hydrolysis of poly(N-vinylformamide) (PNVF).

3. The method according to claim 2, wherein degree of the hydrolysis is from 10 to 100%.

4. The method according to claim 2, wherein the hydrolysis is acid hydrolysis.

5. The method according to claim 1, wherein the cross-linking agent having general formula IV is selected from the group consisting of N,N'-methylene-bisacrylamide (MBA), 1,4-bis(acryloyl)piperazine, N,N'-(1-methyl-1,2-ethanediyl)bis(2-propenamide), N,N'-propylidenebis(2-propenamide), N,N'-butylidenebis(2-propenamide), N,N'-1,12-dodecanediylbis(2-propenamide), N,N'-1,9-nonanediylbis(2-propenamide), N,N'-1,5-pentanediylbis(2-propenamide), N,N'-1,4-butanediylbis(2-propenamide), N,N'-1,6-hexanediylbis(2-propenamide), N,N'-ethylidenebis(2-propenamide), N,N'-1,3-propanediylbis(2-propenamide), N,N'-1,2-ethanediylbis(2-propenamide), N,N'-1,4-cyclohexanediylbis(2-propenamide), N,N'-1,8-octanediylbis(2-propenamide), N,N'-bis(acryloyly)imidazoline, and mixtures thereof.

6. The method according to claim 1, wherein the compound having general formula III is selected from the group consisting of acrylamide, (meth)acrylamide, N-methylolacrylamide, N-m ethylol(meth)acrylamide, N,N-dimethylaminopropyl acrylamide, N,N-dimethylaminopropylacrylamide, N,N-dimethylaminopropylmethacrylamide, N,N-dimethylaminoethylacrylamide, N-[2-(dimethylamino)-1,1-dimethylethyl]acrylamide and their methyl chloride quaternaries, and mixtures thereof.

7. The method according to claim 1, wherein the reaction is carried out in presence of an initiator.

8. The method according to claim 7, wherein the initiator is a peroxide type initiator.

9. The method according to claim 8, wherein the peroxide type initiator is selected from a group consisting of tert-butyl hydroperoxide (TBHP), dicumyl peroxide, benzoyl peroxide, lauroyl peroxide, 2-butanone peroxide and cyclobutane malonyl peroxide.

10. The method according to claim 1, wherein the reaction is carried out at temperature from 10 to 100° C.

11. The method according to claim 1, wherein weight ratio between the polymer having general formula II and the compound having general formula III is from 2:1 to 1:5.

12. The method according to claim 1, wherein percentage in weight of the cross-linking agent having general formula IV and the compound having general formula III is between 1 and 5% of total weight of all components present in the reaction.

13. The method according to claim 1, wherein
$R_1$ is NH—$R_2$—NH;
$R_2$ is $CH_2$;
$R_3$ is H; and
$R_4$ is H.

14. A cationic polyvinyl amine based copolymer having general formula I

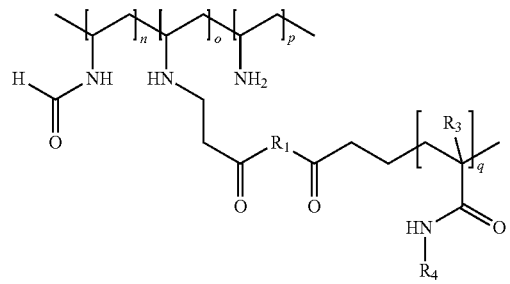

wherein
$R_1$ is selected from NH—$R_2$—NH, 4-imidazoline and a group represented by formula

$R_2$ is selected from the group consisting of $CH_2$, $CH(CH_3)$ $CH_2$, $(CH_2)_2$, $(CH_2)_3$, $(CH_2)_4$, $(CH_2)_5$, $(CH_2)_6$, $(CH_2)_7$, $(CH_2)_8$, $(CH_2)_9$, $(CH_2)_{10}$, $(CH_2)_{11}$, $(CH_2)_{12}$, CH=CH, $CH_2$—CH=CH, $(CH_2)_2$—CH=CH, $CH_2$—CH=CH—$CH_2$, and cyclohexyl;
$R_3$ is selected from H and $CH_3$;
$R_4$ is selected from the group consisting of H, $CH_2OH$, $(CH_2)_2N(CH_3)_2$, $(CH_2)_2N(CH_3)_3Cl$, $(CH_2)_3N(CH_3)_2$, $(CH_2)_3N(CH_3)_3Cl$, $C(CH_3)_2CH_2N(CH_3)_2$ and $CH(CH_3)_2CH_2N(CH_3)_3Cl$;
n and p are independently 0 or positive integer, o, and q are positive integers, and n+o+p ranges from 650 to 26 000, o/(o+p) ranges from 10/100 to 100/100, and q is between 325 and 130 000;
wherein the method comprises reacting a polymer having general formula II.

15. The cationic polyvinyl amine based copolymer according to claim 14, wherein cationic charge of the polymer is from 0.1 to 5 meq/g, measured at pH 2.5 by Mütek method.

16. The cationic polyvinyl amine based copolymer according to claim 14, wherein weight average molecular weight of the cationic polyvinyl amine based copolymer is from 100 000 g/mol to 4 000 000 g/mol.

17. The cationic polyvinyl amine based copolymer according to claim 14, wherein
$R_1$ is NH—$R_2$—NH;
$R_2$ is $CH_2$;
$R_3$ is H; and
$R_4$ is H.

\* \* \* \* \*